(12) United States Patent
Arnold et al.

(10) Patent No.: US 12,531,421 B2
(45) Date of Patent: Jan. 20, 2026

(54) SYSTEM AND METHOD FOR CONTROL OF DISTRIBUTED ENERGY RESOURCES FOR DISTRIBUTION GRID VOLTAGE STABILITY

(71) Applicant: United States Department of Energy, Washington, DC (US)

(72) Inventors: Daniel Arnold, Berkeley, CA (US); Shammya Saha, Knoxville, TN (US); Ciaran Roberts, Berkeley, CA (US); Sy-Toan Ngo, Berkeley, CA (US); Sean Peisert, Berkeley, CA (US); Anna Scaglione, Ithaca, NY (US)

(*) Notice: Subject to any disclaimer, the term of this patent is extended or adjusted under 35 U.S.C. 154(b) by 357 days.

(21) Appl. No.: 17/956,310

(22) Filed: Sep. 29, 2022

(65) Prior Publication Data

US 2024/0113524 A1   Apr. 4, 2024

(51) Int. Cl.
*H02J 3/38* (2006.01)
*H02J 3/18* (2006.01)
*H02M 7/48* (2007.01)

(52) U.S. Cl.
CPC ............... *H02J 3/381* (2013.01); *H02J 3/18* (2013.01); *H02M 7/48* (2013.01); *H02J 2300/24* (2020.01)

(58) Field of Classification Search
CPC ...... H02J 3/18; H02J 3/38; H02J 3/381; H02J 2300/24; H02M 7/48
USPC .......................................................... 307/43
See application file for complete search history.

(56) References Cited

U.S. PATENT DOCUMENTS

| 2011/0026281 A1* | 2/2011 | Chapman | H02M 1/15 363/65 |
| 2017/0250540 A1* | 8/2017 | Varma | H02J 3/46 |

* cited by examiner

*Primary Examiner* — Hal Kaplan
(74) *Attorney, Agent, or Firm* — Timothy L. Harney; Andrew Choi; Michael J. Dobbs (57) ABSTRACT

One or more embodiments relates to a smart inverter used in a photovoltaic (PV) generation system. In one embodiment, the smart inverter includes a PV control logic device; and at least one low pass filter coupled to and in communication with the at least one PV control logic device.

18 Claims, 9 Drawing Sheets

Figure 9C   Time (s)   Figure 9F   Time (s)   Figure 9I   Time (s)

SYSTEM AND METHOD FOR CONTROL OF DISTRIBUTED ENERGY RESOURCES FOR DISTRIBUTION GRID VOLTAGE STABILITY

STATEMENT OF GOVERNMENT SUPPORT

The United States Government has rights in this invention pursuant to Contract No. DE-AC02-05CH11231 between the U.S. Department of Energy and the Regents of the University of California for the operation of the Ernest Orlando Lawrence Berkley National Laboratory.

FIELD OF THE INVENTION

Embodiments relate to rooftop photovoltaic (PV) generation systems. More specifically embodiments relate to an adaptive control approach to adjust the VV/VW control functions of stable PV systems (non-compromised) and active/reactive power injections of other DER (e.g., battery storage systems) to mitigate voltage instabilities.

BACKGROUND

Increasing adoption of Distributed Energy Resources (DER), specifically rooftop photovoltaic (PV) generation systems, is challenging many conventionally held models and practices regarding the operation of the electric power system. While the presence of DER facilitates consumers self-generating at least a portion of their load, it also makes proper management of the power system more difficult as many DER are not utility-owned/operated.

Emerging standards encourage the use of device-level modulation of active and reactive power injection in response to local grid conditions. These autonomous control functions allow DER to quickly correct undesirable voltages and power factors at the point of injection and (in theory) alleviate the need for a response from the grid managing entity. Although these autonomous control functions, specifically smart inverter Volt-VAR (VV) and Volt-Watt (VW) controllers, are well-intentioned, numerous works have emerged showing that proper configuration of individual devices is crucial for the stable operation of the DER population. References discuss the phenomenon of "hunting" in voltages in systems with VV control, where some references modeled the interaction between system voltage magnitudes and PV inverter W functions as a feedback control loop which explicitly ties the slope of the VV controllers of inverters to unstable (highly oscillatory) reactive power injections. Although the instability threshold depends on the specific network characteristics, instability is reached when the slopes of the VV control curves become too steep. Numerous other works have modeled the inverter/grid interaction as a first-order feedback controller and arrived at similar stability conditions. Moreover, adaptive control approaches have been previously applied to improve the interaction of PV systems and the electric grid. Some references consider a control law to adapt PV reactive power injection for loss minimization and over-voltage prevention. Furthermore, the standards for smart inverter functionality have changed and expanded rapidly in the past few years (e.g., IEEE 1547-2018), which led to a variety of different control interfaces and debate in the industry over best practices for managing smart inverter functionality.

A need exists in the art for an adaptive control approach to adjust the VV/VW control functions of stable PV systems (non-compromised) and active/reactive power injections of other DER (e.g., battery storage systems) to mitigate voltage instabilities.

SUMMARY

One object of at least one embodiment is related to stable PV systems (non-compromised). More specifically, embodiments relate to an adaptive control approach to adjust the VV/VW control functions of stable PV systems (non-compromised) and active/reactive power injections of other DER (e.g., battery storage systems) to mitigate voltage instabilities.

While instabilities may arise naturally in a system (due to system reconfiguration, poor parameterizations of VV/VW functions, or intermittency in PV penetration), the remote update capability of many smart inverter devices presents a vulnerability that a malicious entity could purposefully exploit to destabilize the smart inverter/grid interaction. Security researchers have identified exploitable vulnerabilities in deployed inverter firmware, foreign nations are actively targeting the US bulk power system, and in at least one instance, a US inverter control system has been successfully attacked. An excellent example of the extent to which aggregations of smart inverters can be remotely updated was illustrated in Hawaii, where local utilities worked with a smart inverter vendor to remotely update the autonomous control functions of 800,000 inverters in a single day.

In this work, an adaptive control approach is used to adjust the VV/VW control functions of stable PV systems (non-compromised) and active/reactive power injections of other DER (e.g., battery storage systems) to mitigate voltage instabilities in the system. A Model Reference Adaptive Controller (MRAC) approach is used to derive a stabilizing control law. As MRACs utilize a stable reference model to compare to the unstable plant, our work employs the low pass filtered AC grid voltage magnitude measured by the PV system/DER as a proxy for the stable reference model. This choice of reference model makes the algorithm decentralized, (system) model-free, and communications-free. The proposed adaptation mechanism is designed via Lyapunov analysis to drive the error between the plant and the reference asymptotically to zero.

One embodiment relates to a smart inverter used in a photovoltaic (PV) generation system, where the smart inverter includes a PV control logic device; and at least one low pass filter coupled to and in communication with the at least one PV control logic device.

Another embodiment relates to a distributed energy resource system, where the system includes a grid having voltage v; one or more unstable devices coupled to the grid and one or more controllable devices coupled to at least the grid. The one or more unstable devices are adapted to inject active power p and reactive power q into the grid. The one or more controllable devices are adapted to inject active power p and reactive power q into the grid, where voltage v may be measured, and active power p and reactive power q may be adjusted by an adaptive control signal u.

Still another embodiment relates to a method for controlling a distributed energy resource system, where the method includes producing active power injection values, and inputting the active power injection values into a grid. The method further includes producing reactive power injection values; and inputting the reactive power injection values into the grid.

BRIEF DESCRIPTION OF THE DRAWINGS

The invention together with the above and other objects and advantages will be best understood from the following detailed description of the preferred embodiment of the invention shown in the accompanying drawings, wherein.

DETAILED DESCRIPTION

The foregoing summary, as well as the following detailed description of certain embodiments of the present invention, will be better understood when read in conjunction with the appended drawings.

The following detailed description should be read with reference to the drawings in which similar elements in different drawings are numbered the same. The drawings, which are not necessarily to scale, depict illustrative embodiments and are not intended to limit the scope of the invention.

One or more embodiments relate to an adaptive control approach to adjust the VV/VW control functions of stable PV systems (referred to as non-compromised) and active/reactive power injections of other DER (e.g., battery storage systems) to mitigate voltage instabilities in the system. In one or more embodiments a Model Reference Adaptive Controller (MRAC) approach may be used to derive a stabilizing control law. As MRACs utilize a stable reference model to compare to the unstable plant, embodiments employ a low pass filtered AC grid voltage magnitude measured by the PV system/DER as a proxy for the stable reference model. These embodiments make the algorithm decentralized, (system) model-free, and communications-free.

It should be appreciated that an adaptive control scheme in accordance with at least one embodiment mitigates inverter-driven oscillations caused by a portion of DER smart inverters with unstable VV/VW settings. The adaptive control scheme includes one or more of the following properties:

1) Embodiments are model-free and require no knowledge of the topology of the system;
2) Embodiments utilize non-compromised DER to mitigate oscillations introduced by other smart inverters;
3) Embodiments comply with existing smart inverter standards (IEEE 1547);
4) Embodiments can mitigate unstable inverter driven oscillations in the seconds after the oscillations first manifest in the network.

Figure 1:
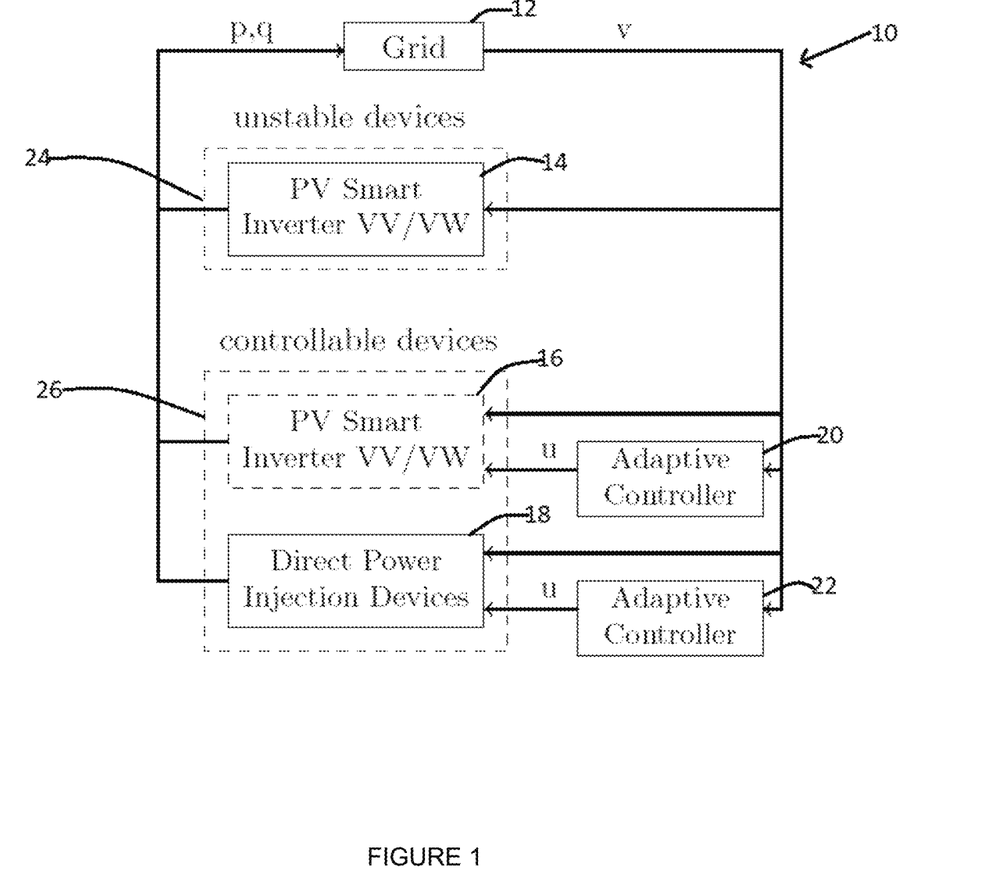
FIG. 1 depicts a block diagram illustrating controllable devices in accordance with one embodiment.

FIG. 1 depicts a high-level block diagram of a system, generally designated 10, illustrating controllable devices in accordance with one embodiment. FIG. 1 depicts system 10 including electric grid 12 and PV Smart Inverter VV/VW 14, PV Smart Inverter VV/VW 16, and Direct Power Injection Devices 18 in communication therewith. FIG. 1 further depicts adaptive controller 20 and adaptive controller 22 in communication with the grid 12, PV Smart Inverter VV/VW 16, and Direct Power Injection Devices 18, where Adaptive Controller 20 is in communication with PV Smart Inverter VV/VW 16 while Adaptive Controller 22 is in communication with Direct Power Injection Devices 18. As illustrated, PV Smart Inverter VV/VW 14 forms unstable devices 24 while PV Smart Inverter VV/VW 16 and Direct Power Injection Devices 18 form controllable devices 26. It should be appreciated that in one or more embodiments, communication may comprise electrical communication or any other means of transmitting electrical signals.

FIG. 1 demonstrates the role of the adaptive control approach, illustrating three categories of devices (PV Smart Inverter VV/VW 14, PV Smart Inverter VV/VW 16, and Direct Power Injection Devices 18) in communication and feedback with the electric grid 12. One, more, even all the devices can inject active (p) and reactive (q) power into the grid and can measure the voltage (v) at their point of interconnection. While a portion of smart inverters in the system with VV/VW capabilities are unstable (unstable device 24), another portion of smart inverters and other DER capable of directly injecting power into the grid are adjusted by the proposed adaptive control signal u (controllable devices 26). It should be appreciated that direct power injection devices are systems that do not determine their power injection setpoints indirectly through another control mechanism such as VV/VW control. An example of a direct power injection device is a battery storage system capable of supporting direct charge/discharge requests. For devices such as these, u is the additional amount of active/reactive power injected (or consumed, if u changes sign) into the grid. However, for PV smart inverter VV/VW controllers (or both), u is a voltage bias added to the measured grid voltage magnitude.

Figure 2:
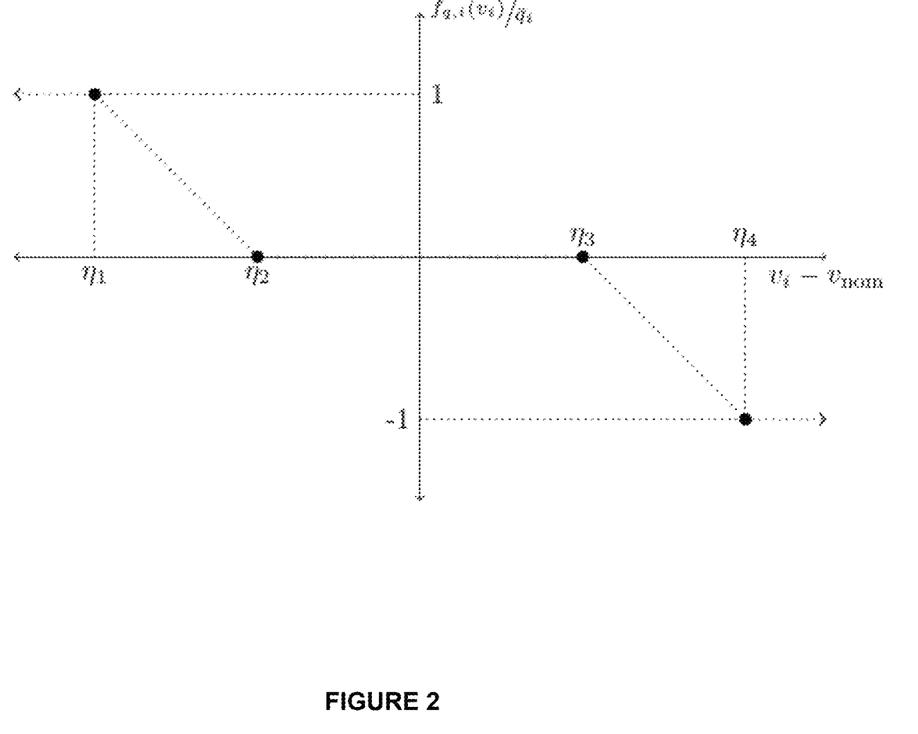
FIG. 2 depicts a graph illustrating an inverter Volt-VAR curve.
Figure 3:
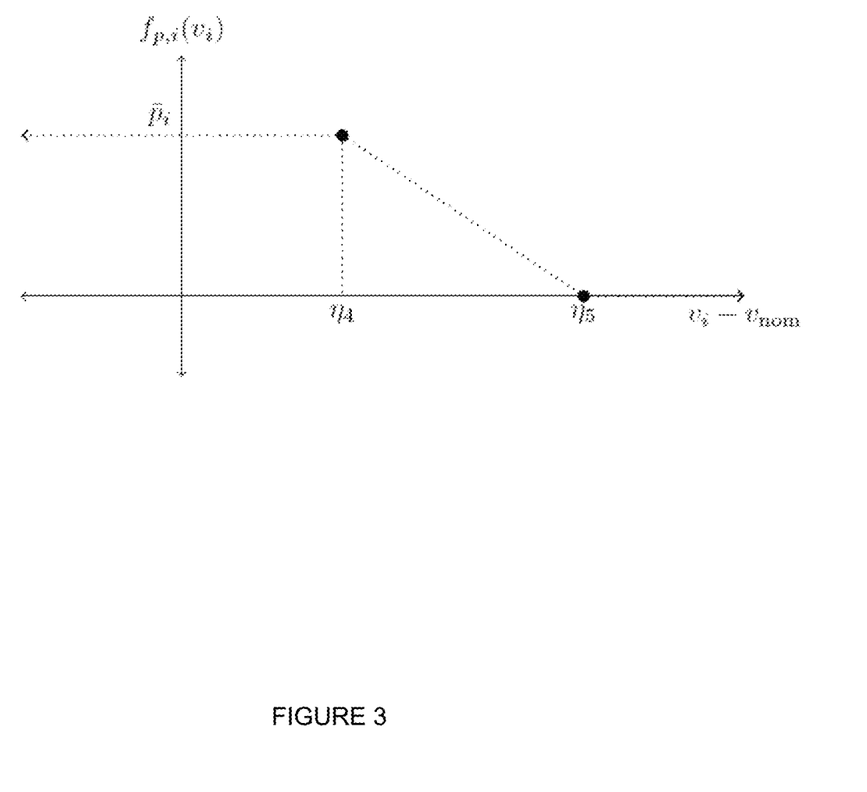
FIG. 3 depicts a graph illustrating an inverter Volt-Watt curve.

In accordance with one embodiment of the present invention, smart inverter VV/VW 16 performs VV and VW functions to compute reactive and active power setpoints, respectively, as functions of deviations of locally sensed voltages from a nominal value (typically 1 p.u.). Herein, $f_{p,i}(v_i)$ and $f_{q,i}(v_i)$ denote the VV and VW control functions for a smart inverter at node i. FIG. 2 depicts a graph illustrating an inverter Volt-VAR curve, where positive values denote VAR injection and where $v_{nom}$ is the nominal voltage value. FIG. 3 depicts a graph illustrating an inverter Volt-Watt curve, where positive values denote watt injection and where $v_{nom}$ is the nominal voltage value. FIGS. 2 and 3 depict the control laws and consist of continuous piece-wise linear functions of the voltage deviation $v_{nom}$.

Figure 4:
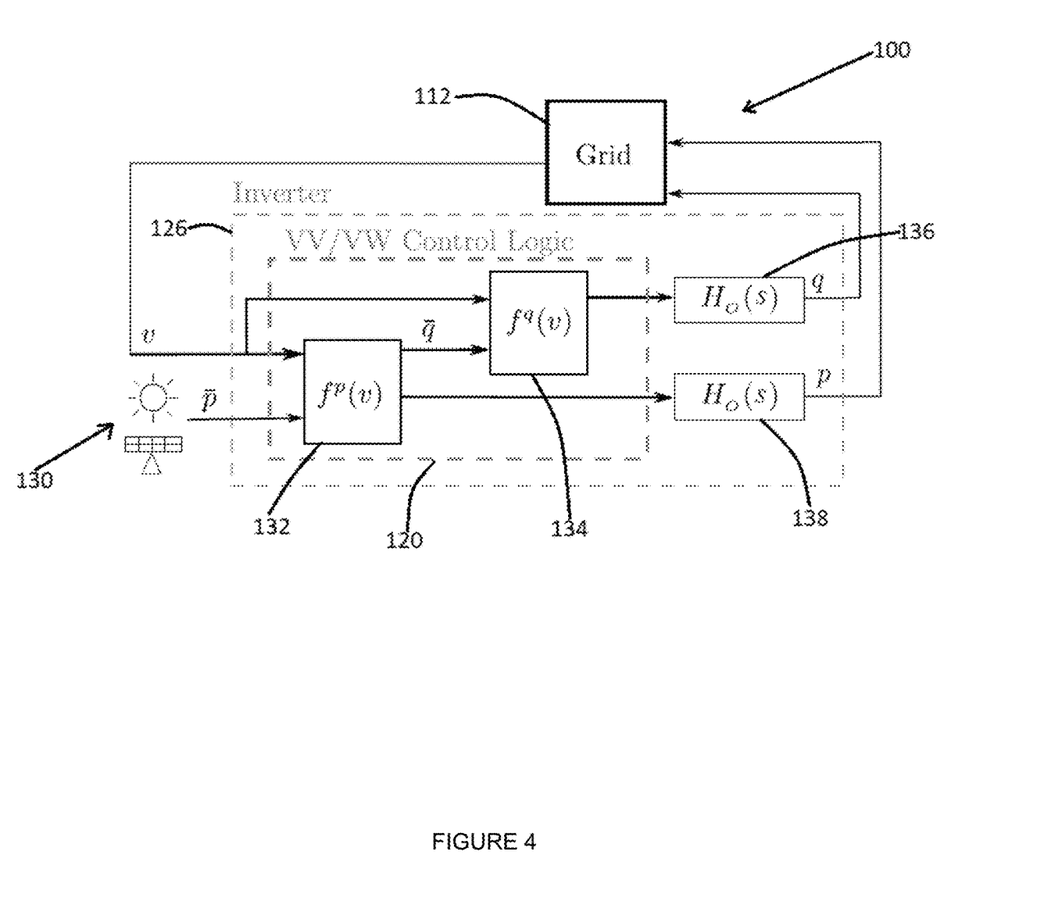
FIG. 4 depicts a block diagram illustrating a smart inverter.

FIG. 4 depicts a block diagram of a model, generally designated 100, in accordance with one embodiment utilizing VV and VW control logic. As is shown in FIG. 4, model 100 includes smart inverter 126 coupled to grid 112 and solar array 130, where the grid 112 has grid voltage v. As illustrated, smart inverter 126 is comprised of VV/VW control logic 120 coupled to one or more low pass filters by HO(s) 136, 138.

In the embodiment shown in FIG. 4, VV/VW control logic 120 is comprised of VV and VW controllers 132, 134 respectively, where $f^p(v)$ denotes the VW control function and $f^q(v)$ denotes the VV control function. The maximum available active power from the solar array 130, identified as macron p, is an input to the VW controller 132, which along with grid voltage v, determines the maximum amount of reactive power available for injection/consumption macron q is then input to the VV controller 134. The active and reactive power setpoints produced by the VW and VW controllers 132, 134 using the control functions $f^p(v)$ and $f^q(v)$ are passed to low pass filters HO(s) 136, 138 producing the active and reactive power injections that are injected into the grid 112. These filters serve to limit the rate at which the active and reactive powers injected by PV systems can change.

The disclosed adaptive control approach described herein uses non-compromised (i.e., stably-behaving) devices to drive system voltages to regions where the compromised smart inverter VV/VW controllers 132,134 produce constant power with respect to changing voltages (i.e., the flat regions of FIGS. 2 and 3). Two types of devices are considered: 1) devices capable of direct power injection/consumption, and 2) non-compromised PV systems (see FIG. 1).

Alternative embodiments for adaptive power injection/consumption may include stabilizing the system described above via introducing a bias term into the measured voltage to "trick" non-compromised smart inverters into operating in a stable region. Biasing the voltage signal input to the VV/VW controllers is accomplished via adding a term to the voltage measured directly from the grid. This strategy is equivalent to translating the VV/VW curves along their voltage axis.

One or more embodiments includes a method for controlling a distributed energy resource system similar to that described herein. The method includes producing active power injection values; and inputting the active power injection values into a grid. The method further includes producing reactive power injection values; and inputting the reactive power injection values into the grid. One or more embodiments may include computing active set points used to produce the active power injection values, receiving a maximum available amount of active power from a solar array and voltage v from the grid and computing active set points; and/or computing reactive set points used to produce the reactive power injection values.

The proposed adaptive control scheme is designed to function as a supervisory controller operating on a slower timescale than other fast-acting power electronics-based controllers in the system, e.g., STATCOM and SVR. This ensures that, in the presence of these devices, there are no adverse interactions nor do the proposed controllers impede their operation. Instead, the proposed approach serves as an additional layer of control that would help mitigate oscillatory instabilities in the absence of these devices, or should these devices have insufficient controllability.

Figure 5:
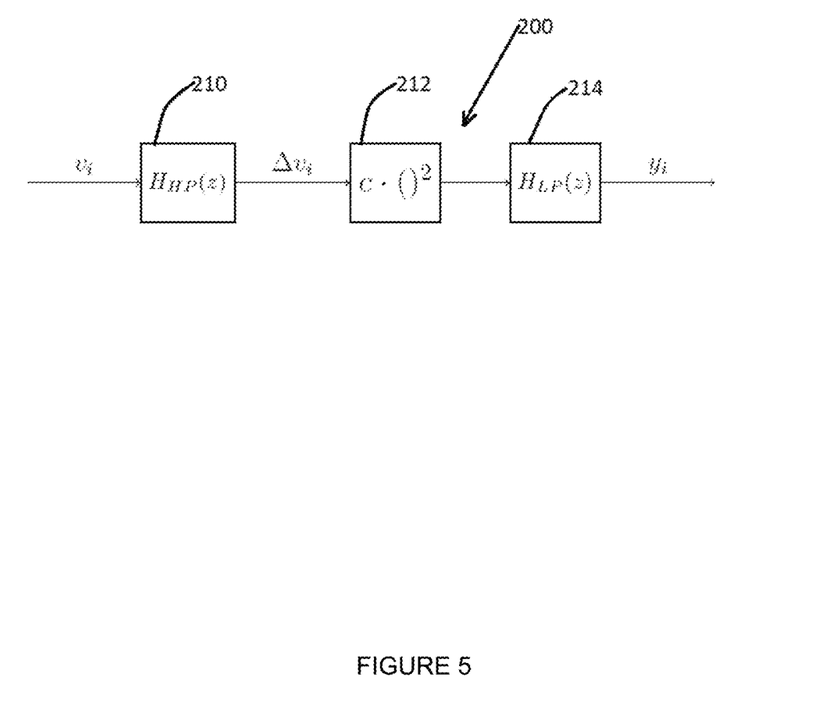
FIG. 5 depicts a block diagram illustrating the filtering process.

FIG. 5 depicts a block diagram illustrating an intuitive filtering process used to compute a measurement of the intensity of voltage oscillations. In the illustrated embodiment, the intuitive filtering process extracts the "energy" associated with observed voltage oscillations. The filter, generally designed 200, consists of the series connection of a high-pass filter HHP 210, a signal square element (with positive gain c) 212, and a low-pass filter HLP 214. The output of filter 200 (output of a low-pass filter HLP 214 or $y_i$) is a non-negative value that increases as the amplitude of the oscillations in node i voltage (input to high-pass filter HHP 210 or $v_i$) increases. It should be appreciated that for proper operation of filter 200, the high and low-pass filter critical frequencies are chosen as to not attenuate oscillations resulting from cyber-attacked inverters.

Figure 6:
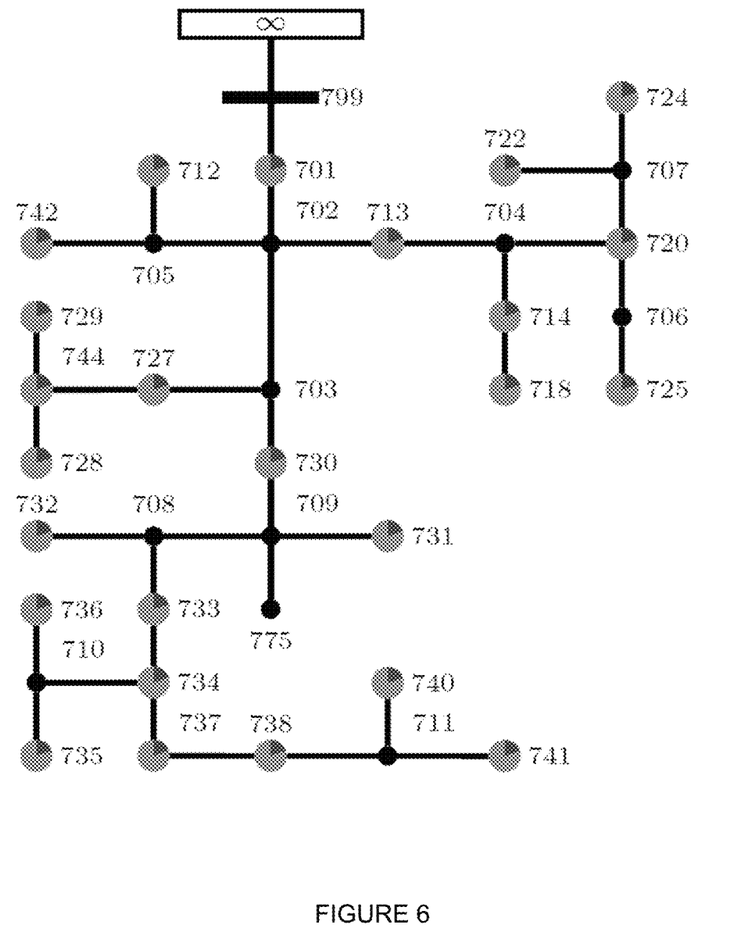
FIG. 6 depicts a distribution system network represented as a graph (a collection of nodes and edges)
Figure 7:
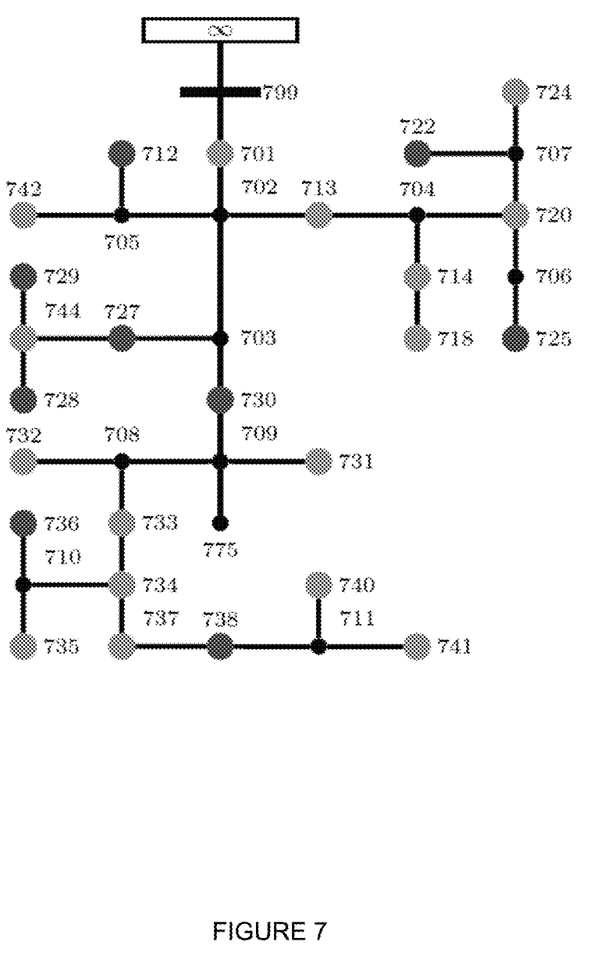
FIG. 7 depicts another distribution system network represented as a graph (a collection of nodes and edges)

In one embodiment smart inverters and non-compromised smart inverters with adaptive controllers are co-located at the same nodes in the feeder (see FIG. 6). In another embodiment, destabilizing smart inverters and adaptive controllers are placed at different nodes in the feeder (see FIG. 7). Both FIGS. 6 and 7 depict the fraction of smart inverters responsible for creating instabilities (i.e., Mu) and the remaining portion of smart inverters which can be utilized for adaptive voltage bias control (i.e., Ms). In all experiments, smart inverters had a peak active power generation of 100% of the nominal load with an additional 10% inverter over-sizing for reactive power headroom.

Figure 8A:
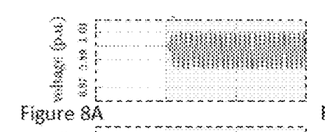
FIGS. 8A-8R depict graphs illustrating test results.

Experiments were conducted on an IEEE 37 node feeder and an IEEE 8500 test feeder to verify the performance of the adaptive control scheme in mitigating smart inverter-driven voltage instabilities in three-phase unbalanced systems in accordance with one embodiment. Simulation results for all feeders/scenarios are depicted in FIGS. 8A-8R and 9A-9I, where distinct experiments are ordered column wise. In the Figures, the first column illustrates results for one scenario on an IEEE 37 node test feeder, the second column illustrates results for a second scenario on an IEEE 37 node test feeder, and the third column illustrates results for one scenario on the IEEE 8500 test feeder. Additionally, each column of FIGS. 8A-8R depicts three voltage time-series from a selected node and phase in each respective feeder featuring a base case without adaptive control, the results from the application of adaptive voltage bias, and results from the application of adaptive power injection. Directly under each voltage time series subplot is an additional timeseries showing the associated oscillation "energy" (i.e., $y_i$ from FIG. 5). FIGS. 9A-9I depict feeder-wide statistics of y as a function of simulation time for each separate feeder/scenario, for the base case, adaptive voltage bias, and adaptive power injection.

Figure 8B:
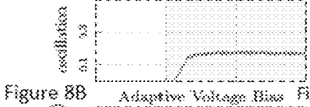
Figure 8C:
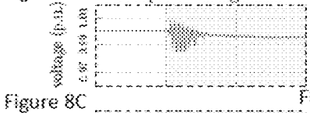
Figure 8D:
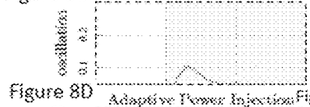
Figures 8E, 8K:
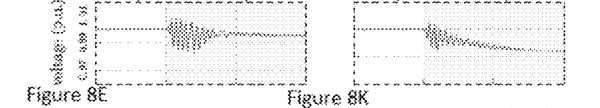
Figure 8F:
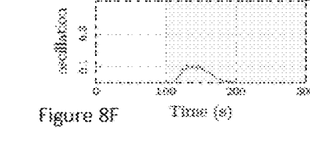

Test results for one scenario using the IEEE 37 Node Feeder for the smart inverter deployment depicted in FIG. 6 are illustrated in FIGS. 8A-8F. In these experiments, at t=100 s, inverters in the set Mu, which represent 30% of the inverter resource at each node, were issued new VV/VW curves with steeper non-zero segments, resulting in instability. The voltage magnitude at node 741 (phase C) without the presence of any adaptive control and the associated oscillation energy are illustrated in the subplots of FIGS. 8A-8B. The subplots of FIGS. 8C-8D depict node 741 phase C voltage magnitude when inverters in Ms utilize adaptive voltage bias and the associated oscillation energy. Subplots FIGS. 8E-8F depict node 741 phase C voltage when adaptive (reactive) power injection is employed at nodes where inverters in Ms are located and the associated oscillation energy. Both control strategies mitigate the oscillations within approximately 80 seconds of the onset of the instability. The results illustrated in FIGS. 9A-9C indicate that both the adaptive power injection and the adaptive voltage bias controllers mitigate oscillations at all nodes in the system.

Test results for another scenario using the IEEE 37 Node Feeder for the smart inverter deployment depicted in FIG. 7 are shown in FIGS. 8G-8L. In these experiments, at t=100 s, inverters in the set Mu, which represent approximately 30% of the capacity in the system, were issued new VV/VW curves with steeper non-zero segments, resulting in an instability.

Figure 8G:
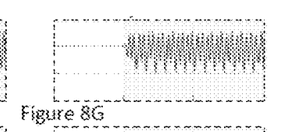
Figure 8H:
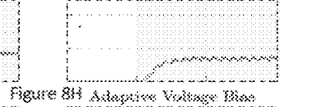
Figure 8I:
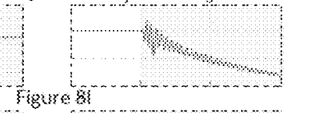
Figure 8J:
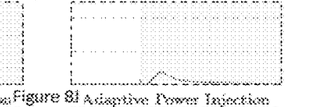
Figure 8L:
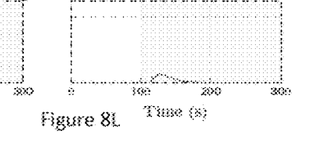
Figure 8M:
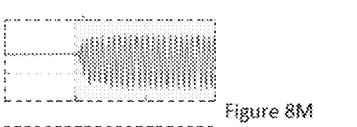
Figure 8N:
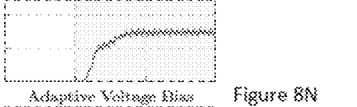

The voltage magnitude at node 741 (phase C) without the presence of any adaptive control and the associated oscillation energy are shown in the subplots FIGS. 8G-8H. The subplots shown in FIGS. 8I-8J depict node 741 phase C voltage magnitude when inverters in Ms utilize adaptive voltage bias and the associated oscillation energy. Subplots shown in FIGS. 8K-8L depict node 741 phase C voltage when adaptive (reactive) power injection is employed at nodes where inverters in Ms are located and the associated oscillation energy. Both control strategies mitigate the oscillations within approximately 100 seconds of the onset of the instability. FIG. 7 shows the IEEE 37 node test feeder with smart inverters from the sets Ms and Mu located at different nodes. Controllers mitigate oscillations at all nodes in the system.

Figure 8O:
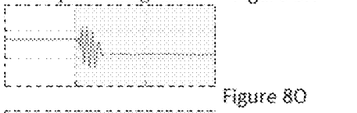
Figure 8P:
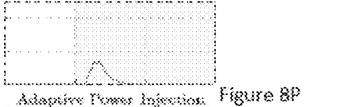
Figure 8Q:
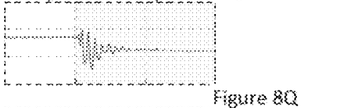
Figure 8R:
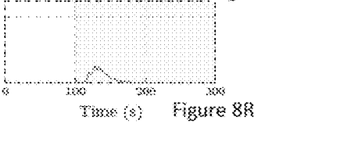
Figure 9A:
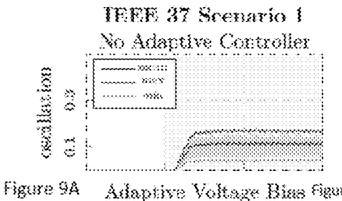
FIGS. 9A-9I depict graphs illustrating test results.
Figure 9B:
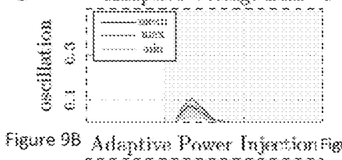
Figure 9C:
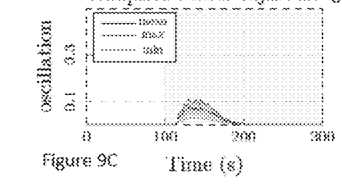
Figures 9D, 9G:
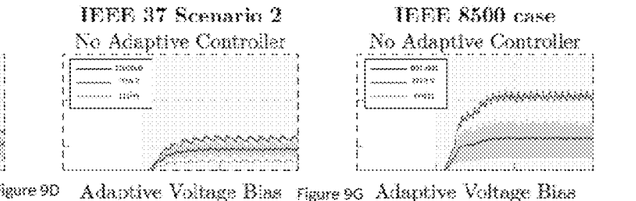
Figures 9E, 9H:
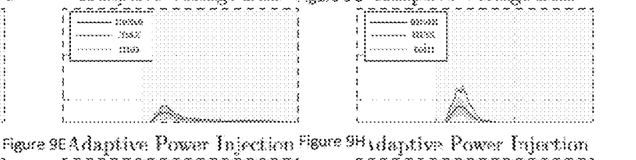
Figures 9F, 9I:
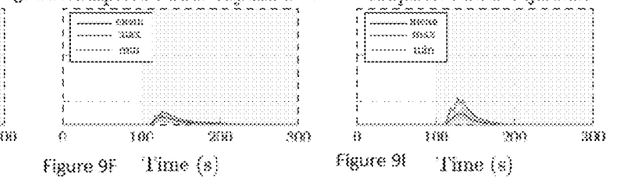

Test results for one scenario using the IEEE 8500 Node Feeder for the smart inverter deployment on the IEEE 8500 feeder are shown in FIGS. 8M-8R. In these experiments, at t=100s, inverters in the set Mu, which represent 30% of the inverter resource at each node, were issued new VV/VW curves with steeper non-zero segments, resulting in an instability. The voltage magnitude at node 337668b0a (phase A) without the presence of any adaptive control and the associated oscillation energy are shown in subplots shown in FIGS. 8M-8N. The subplots shown in FIGS. 8O-8P depict node 337668b0a phase A voltage magnitude and the associated oscillation intensity when inverters in Ms utilize adaptive voltage bias. The subplots shown in FIGS. 8Q-8R depict node 337668b0a phase A voltage and the associated oscillation intensity when adaptive reactive power injection is employed at nodes where inverters in Ms are located. Both control strategies mitigate the oscillations within approximately 60 seconds of the onset of the instability. The results shown in FIGS. 9G-9I, indicate that both the adaptive power injection and the adaptive voltage bias controllers mitigate oscillations at all nodes in the system.

Having described the basic concept of the embodiments, it will be apparent to those skilled in the art that the foregoing detailed disclosure is intended to be presented by way of example. Accordingly, these terms should be interpreted as indicating that insubstantial or inconsequential modifications or alterations and various improvements of the subject matter described and claimed are within the scope of the spirited embodiments as recited in the appended claims. Additionally, the recited order of the elements or sequences, or the use of numbers, letters, or other designations therefor, is not intended to limit the claimed processes to any order except as may be specified. All ranges disclosed herein also encompass all possible sub-ranges and combinations of sub-ranges thereof. Any listed range is easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as up to, at least, greater than, less than, and the like refer to ranges which are subsequently broken down into sub-ranges as discussed above. As utilized herein, the terms "about," "substantially," and other similar terms are intended to have a broad meaning in conjunction with the common and accepted usage by those having ordinary skill in the art to which the subject matter of this disclosure pertains. As utilized herein, the term "approximately equal to" shall carry the meaning of being within 15, 10, 5, 4, 3, 2, or 1 percent of the subject measurement, item, unit, or concentration, with preference given to the percent variance. It should be understood by those of skill in the art who review this disclosure that these terms are intended to allow a description of certain features described and claimed without restricting the scope of these features to the exact numerical ranges provided. Accordingly, the embodiments are limited only by the following claims and equivalents thereto. All publications and patent documents cited in this application are incorporated by reference in their entirety for all purposes to the same extent as if each individual publication or patent document were so individually denoted.

All numeric values are herein assumed to be modified by the term "about", whether explicitly indicated. The term "about" generally refers to a range of numbers that one of skill in the art would consider equivalent to the recited value (e.g., having the same function or result). In many instances, the terms "about" may include numbers that are rounded to the nearest significant figure.

The recitation of numerical ranges by endpoints includes all numbers within that range (e.g., 1 to 5 includes 1, 1.5, 2, 2.75, 3, 3.80, 4, and 5).

One skilled in the art will also readily recognize that where members are grouped together in a common manner, such as in a Markush group, the present invention encompasses not only the entire group listed as a whole, but each member of the group individually and all possible subgroups of the main group. Accordingly, for all purposes, the present invention encompasses not only the main group, but also the main group absent one or more of the group members. The present invention also envisages the explicit exclusion of one or more of any of the group members in the claimed invention.

What is claimed is:

1. A smart inverter used in a photovoltaic (PV) generation system, the smart inverter comprising:
   a PV control logic device selected from the group consisting of a volt-VAR (VV) control logic device, a volt-WATT (VW) control logic device, and a VV/VW control logic device; and at least one low pass filter coupled to and in communication with the at least one PV control logic device.

2. The smart inverter of claim 1 wherein the at least one low pass filter comprises two low pass filters, one low pass filter coupled to one logic controller and another low pass filter coupled to another logic controller.

3. The smart inverter of claim 1 wherein the PV control logic device comprises a first VV/VW control logic device coupled to a grid both the first VV/VW control logic device and the second VV/VW control logic device receiving maximum available active power from a solar array and voltage v and computing reactive set points.

4. The smart inverter of claim 3 wherein the at least one low pass filter comprises a first low pass filter coupled to the first VV/VW control logic device and producing active power injections into the grid and a second low pass filter coupled to the second VV/VW control logic device and producing reactive power injections into the grid.

5. A distributed energy resource system, the system comprising:
   a grid having voltage v, one or more unstable devices coupled to at least the grid and adapted to inject active power p and reactive power q into the grid, and one or more controllable devices coupled to at least the grid, the controllable devices adapted to inject active power p and reactive power q into the grid, where voltage v is measured, and active power p and reactive power q are adjusted by an adaptive control signal u.

6. The system of claim 5 wherein at least one of the one or more controllable devices comprises:
   a smart inverter device adapted to inject active power p and reactive power q into the grid; at least one adaptive controller coupled to the grid and the smart inverter device, where voltage v is measured, and active power p and reactive power q are adjusted by an adaptive control signal u.

7. The system of claim 6 wherein the smart inverter device comprises:
a PV control logic device; and at least one low pass filter coupled to and in communication with at least the PV control logic device.

8. The smart inverter device of claim 7 wherein the PV control logic device comprises a first VV/VW control logic device coupled to the grid and receiving a maximum available amount of active power from a solar array and voltage v and computing active set points, and a second VV/VW control logic device coupled to the grid and receiving maximum available active power from a solar array and voltage v and computing reactive set points.

9. The smart inverter device of claim 8 wherein at least one low pass filter comprises a first low pass filter coupled to the first VV/VW control logic device and producing active power injections into the grid and a second low pass filter coupled to the second VV/VW control logic device and producing reactive power injections into the grid.

10. A method for controlling a distributed energy resource system, the method comprising:
receiving a maximum available amount of active power from a solar array and voltage v from a grid and computing active set points forming computed active set points; producing active power injection values using the computed active set points, inputting the active power injection values into the grid; producing reactive power injection values; and inputting the reactive power injection values into the grid.

11. The method of claim 10 further comprising computing reactive set points used to produce the reactive power injection values.

12. The method of claim 11 further comprising receiving a maximum available amount of reactive power from a solar array and voltage v from the grid and computing the reactive set points.

13. A smart inverter used in a photovoltaic (PV) generation system, the smart inverter comprising:
a PV control logic device comprising a first VV/VW control logic device coupled to a grid-and a second VV/VW control logic device coupled to the grid, where both the first VV/VW control logic device and the second VV/VW control logic device receiving maximum available active power from a solar array and voltage v and computing reactive set points; and at least one low pass filter coupled to and in communication with the at least one PV control logic device.

14. The smart inverter of claim 13 wherein the at least one low pass filter comprises two low pass filters, one low pass filter coupled to one logic controller and another low pass filter coupled to another logic controller.

15. The smart inverter of claim 13 wherein the at least one low pass filter comprises a first low pass filter coupled to the first VV/VW control logic device and producing active power injections into the grid and a second low pass filter coupled to the second VV/VW control logic device and producing reactive power injections into the grid.

16. A method for controlling a distributed energy resource system, the method comprising:
producing active power injection values; inputting the active power injection values into a grid; receiving a maximum available amount of reactive power from a solar array and voltage v from the grid and computing the reactive set points; producing reactive power injection values using the reactive set points; and inputting the reactive power injection values into the grid.

17. The method of claim 16 further comprising receiving a maximum available amount of active power from a solar array and voltage v from the grid and computing active set points.

18. The method of claim 17 further providing the active power injection values using the active set points.

\* \* \* \* \*